US007546545B2

(12) United States Patent
Garbow et al.

(10) Patent No.: US 7,546,545 B2
(45) Date of Patent: Jun. 9, 2009

(54) EMPHASIZING DROP DESTINATIONS FOR A SELECTED ENTITY BASED UPON PRIOR DROP DESTINATIONS

(75) Inventors: Zachary Adam Garbow, Rochester, MN (US); Bryan Mark Logan, Rochester, MN (US); Terrence Theodore Nixa, Rochester, MN (US); Kevin Glynn Paterson, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 11/535,550

(22) Filed: Sep. 27, 2006

(65) Prior Publication Data

US 2008/0077874 A1 Mar. 27, 2008

(51) Int. Cl.
*G06F 3/048* (2006.01)
*G06F 3/033* (2006.01)

(52) U.S. Cl. .................. 715/769; 715/779; 715/863
(58) Field of Classification Search ........... 715/769, 715/779, 863
See application file for complete search history.

(56) References Cited

U.S. PATENT DOCUMENTS

| | | | | |
|---|---|---|---|---|
| 5,786,805 | A * | 7/1998 | Barry | 345/159 |
| 5,874,962 | A * | 2/1999 | de Judicibus et al. | 715/789 |
| 6,075,531 | A * | 6/2000 | DeStefano | 715/788 |
| 6,285,374 | B1 * | 9/2001 | Falcon | 715/856 |
| 6,342,877 | B1 * | 1/2002 | Nikom | 345/157 |
| 6,567,070 | B1 * | 5/2003 | Light et al. | 345/157 |
| 6,587,131 | B1 * | 7/2003 | Nakai et al. | 715/857 |
| 6,693,653 | B1 * | 2/2004 | Pauly | 715/857 |
| 6,801,230 | B2 * | 10/2004 | Driskell | 715/854 |
| 6,816,176 | B2 * | 11/2004 | Laffey et al. | 715/860 |
| 7,231,609 | B2 * | 6/2007 | Baudisch | 715/769 |
| 2004/0150664 | A1 * | 8/2004 | Baudisch | 345/740 |
| 2007/0271524 | A1 * | 11/2007 | Chiu et al. | 715/767 |

OTHER PUBLICATIONS

"About This Project", Web Adaptation Technology Web Site Printout downloaded from http://www.webadapt.org/ibm/about/default/php-?PageID=2&LangID=Lang1&Font=1 on Jun. 14, 2006, 2 pages.
Baudisch, Patrick, "drag-and-pop", drag-and-pop homepage downloaded from http://patrickbaudisch.com/projects/dragandpop/ on Jun. 13, 2006, 1 page.

(Continued)

*Primary Examiner*—William L Bashore
*Assistant Examiner*—David Phantana-angkool
(74) *Attorney, Agent, or Firm*—Wood, Herron & Evans, LLP

(57) ABSTRACT

A method that emphasizes at least one drop destination for a selected entity based upon monitored drop destinations. Drop destinations may be emphasized by generating a plurality of path vectors between the selected entity and at least a portion of the plurality of drop destinations. Generally, by emphasizing drop destinations, the potential drop destinations for the selected entity may be anticipated and emphasized to the user, which may increase the likelihood that the user will drop onto the desired drop destination. Moreover, a user may choose one of the drop destinations by dropping the selected entity along the path vector associated with the desired drop destination. As such, drag and drop operations may be successfully completed with fewer mouse movements and/or less precision, often resulting in fewer accidental drops.

13 Claims, 5 Drawing Sheets

OTHER PUBLICATIONS

Hascoët, Mountaz, Throwing Models for Large Displays, HCI'2003, Designing for Society, British HCI Group (2003), vol. 2, pp. 73-77, 4 pages.

"New dragging paradigms", New dragging paradigms—maxime collomb homepage downloaded from www.lirmm.fr/collomb/dragging/index.html on Jun. 13, 2006, 6 pages.

* cited by examiner

EMPHASIZING DROP DESTINATIONS FOR A SELECTED ENTITY BASED UPON PRIOR DROP DESTINATIONS

FIELD OF INVENTION

The invention relates to computers and computer systems, and human interaction with a computer. In particular, the invention is related to dragging and dropping operations in a graphical user interface.

BACKGROUND OF THE INVENTION

As computers have become more complex and powerful, the manner in which end users or operators interface with computers has grown increasingly important. Early computers relied on switches, lights, and/or punch cards that required an end user to interact essentially in the computers' native binary languages. Eventually, video displays were developed that enabled end users to interact with computers through textual information and commands. Another significant step in this evolution was the development of graphical user interfaces (GUI's), which permitted end users to interact with computers through the more intuitive operations of "pointing and clicking" on graphical display elements or objects with a pointer (or cursor) controlled by a mouse or other user interface device.

Many GUI's also support a "drag and drop" metaphor. Dragging and dropping functionality allows a user to perform an operation such as moving graphical display elements or cutting and pasting graphical display elements via a mouse. In addition, when a drop destination is for an application, typically any document or file that is dropped on the destination, results in the document or file being opened in that application. Dragging may be accomplished by positioning a pointer over a graphical display element to be dragged, depressing a mouse button, moving the mouse while the button is depressed until the pointer and the dragged element are over the desired drop destination, and then releasing the mouse button.

Positioning a pointer over a desired graphical display element such as an icon and successfully dragging and dropping the graphical display element to the desired destination is often difficult to accomplish, leading to frustration and/or lowered productivity. In particular, a successful drag and drop operation may require significant mouse movement and a level of accuracy that some users may not possess. Also, in some instances a user may accidently drop an element on the wrong destination, leading to unintended results. In some instances, a user may have diminished visual or physical abilities such as reduced dexterity, reduced hand-eye coordination, unsteady hands, etc. that may further hinder success. An unsuccessful drag and drop operation is problematic because the user may have to repetitively readjust the pointer and repetitively drag and drop the graphical display element, and may result in an accidental drop. An accidental drop may result, for example, in the unintentional dropping of a graphical user display for a document onto a graphical display element for the trash, or some folder or directory, or possibly on an element for an application that is ordinarily not used to open the document.

Additionally, unsuccessful drag and drop operations may also be attributable to the computer system. For example, a web environment may hinder successful drag and drop operations due to web page latency, smaller window sizes, or a high density presentation of multiple graphical display elements. Similarly, some devices such as palm-held devices and other mobile devices have both small displays and less precise navigation methods, which may make graphical display elements extremely difficult to drag and drop successfully.

Although some tools are available to assist users with dragging and dropping, these tools may significantly change the conventional drag and drop paradigm users are accustomed to and/or may require even greater dexterity and mouse movement than conventional drag and drop operations.

A need therefore exists for an improved manner of assisting users with dropping a graphical display element onto a desired destination.

SUMMARY OF THE INVENTION

The invention addresses these and other problems associated with the prior art by providing a method that emphasizes at least one drop destination for a selected entity based upon monitored drop destinations. Some embodiments consistent with the invention may monitor drop destinations of a plurality of drag and drop operations performed on a plurality of entities and in response to a user initiation of a drag and drop operation on a selected entity, may emphasize one or more drop destinations for the selected entity based upon the monitored drop destinations. Additionally, in some embodiments drop destinations may be emphasized by generating a plurality of path vectors of varying strength between the selected entity and at least a portion of the drop destinations. Generally, by emphasizing drop destinations, the potential drop destinations for a selected entity may be anticipated and emphasized to the user, which may increase the likelihood that the user will drop onto the desired drop destination. Moreover, a user may choose one of the drop destinations by dropping the selected entity along the path vector associated with the desired drop destination. As such, drag and drop operations may be successfully completed with fewer mouse movements and/or less precision, often resulting in fewer accidental drops.

Therefore, consistent with one aspect of the invention, a computer may be interacted with by monitoring drop destinations of a plurality of drag and drop operations performed on a plurality of entities, thereafter, in response to a user initiation of a drag and drop operation on a selected entity, at least one drop destination for the selected entity may be emphasized based upon the monitored drop destinations.

These and other advantages and features, which characterize the invention, are set forth in the claims annexed hereto and forming a further part hereof. However, for a better understanding of the invention and the advantages and objectives obtained through its use, reference should be made to the Drawings, and to the accompanying descriptive matter, in which there is described exemplary embodiments of the invention.

DETAILED DESCRIPTION

Figure 1:
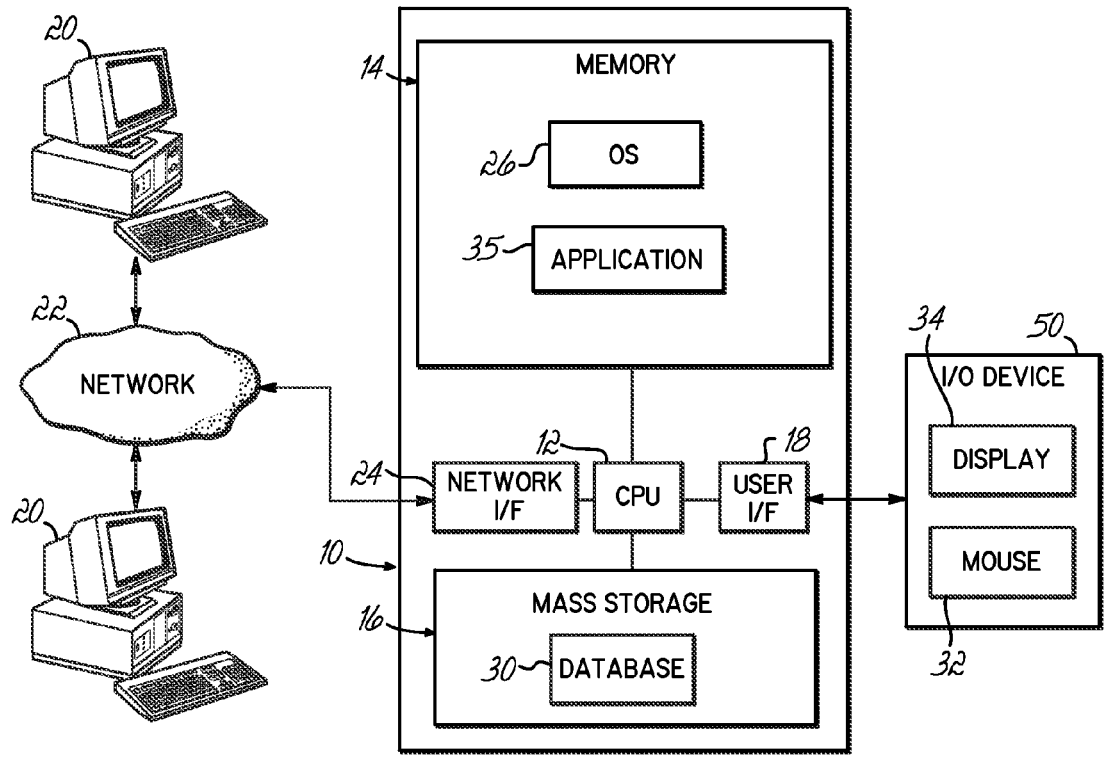
FIG. 1 is a block diagram of the networked computer system within which is implemented dragging and dropping consistent with the invention.

The embodiments discussed hereinafter emphasize at least one drop destination for a selected entity based upon monitored drop destinations. The monitored drop destinations are often drop destinations from prior drag and drop operations. In some embodiments, however, the monitored drop destinations may also include potential drop destinations that have never actually been destinations for prior drag and drop operations, but which, due to other factors, may potentially be suitable drop destinations for certain entities. For example, an icon for a newly created folder might be considered a potential candidate as a drop destination for a document or file irrespective of whether that folder had yet served as a drop destination. As another example, an icon for a newly installed program might be considered a potential candidate as a drop destination for entities associated with a particular file type prior to that icon ever being a destination for a drag and drop operation (e.g., a newly installed PDF reader would be a logical drop destination for any PDF files). As such, in some embodiments, when no history data relating to prior drag and drop operations associated with certain entities and/or drop destinations is available, or if insufficient history data is available, drop destinations and/or path vector strengths may be determined based upon factors other than history data.

At least one drop destination may be emphasized, for example, by generating a plurality of path vectors that are displayed between the drop destinations and the selected entity. The plurality of path vectors generated may be of varying strength and may be displayed to aid users in dragging and dropping entities onto drop destinations. The strength for each path vector represents the likelihood that the selected entity will be dropped onto the drop destination associated with the path vector. Additionally, a drop destination for a selected entity may be emphasized by highlighting the display representation of the drop destination and/or the display representation of the path vector associated with the drop destination, reorganizing or moving the drop destination therefore reorganizing the display representation of the drop destination, etc.

An entity consistent with the invention may be practically any user-manipulated entity that may be subjected to a drag and drop operation in a graphical user interface (GUI). For instance, an entity may be an object, a graphical element, a folder, an icon, a shortcut, a location, an area, any combination thereof, etc. A drop destination consistent with the invention may be any object, graphical element, folder, icon, shortcut, location, or area, suitable for receiving an entity manipulated in a drag and drop operation.

As noted above, one manner of emphasizing drop destinations is through the use of path vectors. A path vector in this context may be practically any relationship or linkage between the selected entity and a drop destination. A path vector may be displayed on a display in a number of ways. For example, a display representation of a path vector may be displayed on a display as a line designated by its end points, which may be x,y coordinates, and may appear as a graphic between a selected entity and a drop destination. The display representation may be a straight line, a curved line, etc., and the line may also have an arrow head at one or both of the end portions. Multiple path vectors may be distinguished from one another, for example, using different type of lines, e.g. lines distinguished from one another by color, width, highlighting, length, etc. Those of ordinary skill in the art will appreciate that although a path vector may be displayed (e.g., a display representation of a path vector may be displayed on a display), a path vector does not need to be displayed consistent with the principles of the present invention.

It is also worth noting that the wording "drag and drop operation" may refer to a drag operation and/or a drop operation, especially since a drag operation is generally followed at some later time with a drop operation. As such, the wording "drag and drop operation", "drag operation", and "drop operation" are used interchangeably herein.

Turning now to the Drawings, wherein like numbers denote like parts throughout the several views, FIG. 1 illustrates an exemplary hardware and software environment for an apparatus 10 suitable for implementing drag and drop operations consistent with the invention. For the purposes of the invention, apparatus 10 may represent practically any type of computer, computer system or other programmable electronic device, including a client computer, a server computer, a portable computer, a handheld computer, a mobile phone, a gaming device, an embedded controller, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

Computer 10 also typically receives a number of inputs and outputs for communicating information externally. For interface with a user or operator, computer 10 typically includes a user interface 18 such as a graphical user interface (GUI) incorporating one or more I/O devices 50 such as one or more user input devices (e.g., a keyboard, a mouse 32 with one or more buttons, a trackball, a joystick, a touchpad, and/or a microphone, among others) and a display 34 (e.g., a CRT monitor, an LCD display panel, and/or a speaker, among others). Display 34 may also be part of a multi-monitor setup, part of a wall-screen dual-display system, among others. Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications 55 (e.g., a web browser, desktop application, etc.), components, programs, objects, modules, data structures, etc. For example, a database management system (DBMS) may be resident in memory 14 to access a database 30 resident in mass storage 16. Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to tangible recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Embodiments consistent with the present invention may be implemented, for example, within a web browser to act upon web pages utilizing Javascript and/or Asynchronous Javascript and XML (AJAX) techniques for drag and drop operations and may also be applicable to traditional applications such as desktop applications and operating system shells. AJAX techniques may allow a web page to retrieve a small amount of data from a server without reloading the entire web page. In particular, when a user initiates a drag and drop operation via a GUI and mouse by selecting and/or beginning to move a droppable entity, the drop destinations may be monitored and stored, for example, in a database, memory, mass storage, etc. by the system. Furthermore, in response to a user initiation of a drag and drop operation on a selected entity via a GUI and mouse, the system may emphasize one or more drop destinations for the selected entity based upon the monitored drop destinations. The system may emphasize drop destinations by generating a plurality of path vectors between the selected entity and at least a portion of the drop destinations. The system may also display representations of the path vectors (e.g., into a non-contacting relationship with a path vector or a drop destination) and reorganize drop destinations (e.g., into a non-contacting relationship with a path vector or a drop destination). The system may also utilize a path vector to automatically select a drop destination, for example, in response to a user dropping along a portion of a display representation of a path vector associated with the drop destination, the system may automatically drop the selected entity onto the drop destination associated with the path vector (i.e., the selected entity is dropped onto the selected drop destination).

Figure 2:
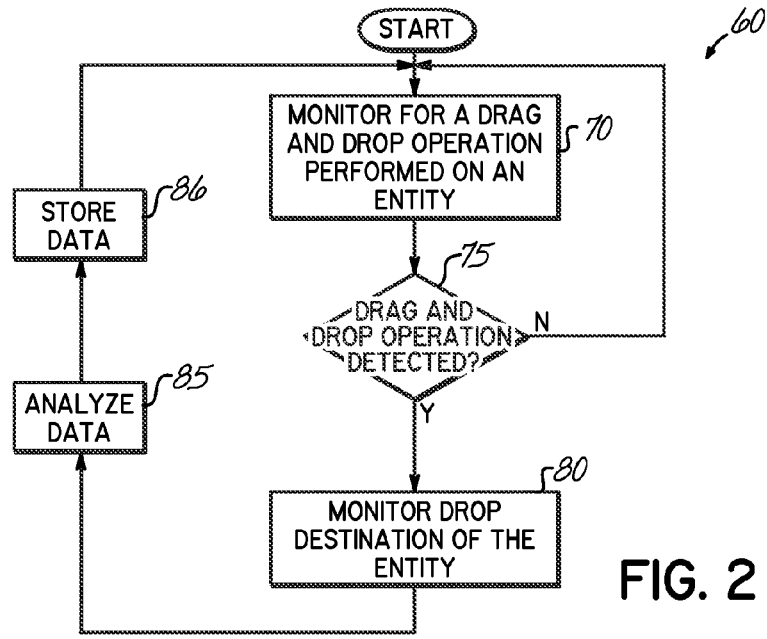
FIG. 2 is a flowchart illustrating a drop destination monitoring routine consistent with the invention.

Turning now to FIG. 2, FIG. 2 illustrates an exemplary drop destination monitoring routine 60 consistent with the principles of the present invention. Routine 60 may be used to determine where entities have been dropped to in the past and thus gauge where other entities, for example, similar entities, will likely be dropped. Turning to block 70, block 70 monitors for a drag and drop operation preformed on an entity. Next, block 75 determines whether a drag and drop operation was detected. If not, then control may return to block 70 to continue to monitor for drag and drop operations. If a drag and drop operation was detected, block 80 monitors the drop destination of the entity. For instance, which entity was dragged and onto which drop destination was the entity dropped.

Next, the data may be analyzed in block 85. For instance, the type of entity as well as the type of the drop destination may be determined (e.g., a graphical display element corresponding to a PDF document entity dropped onto a graphical display element corresponding to a PDF reader, etc.) and stored in block 86. Furthermore, in addition to analyzing the type of the entity and/or the type of drop destination, other data may also be analyzed. For instance, the drop destination itself, which may simply be a location on a display, may be monitored, analyzed and stored regardless of whether or not the entity and drop destination are of the same type. Monitoring drop destinations may include analyzing entities and/or drop destinations consistent with the invention. Next, control may pass to block 70 to continue to monitor for additional drag and drop operations preformed on an entity.

In some embodiments, the drag and drop operations of a single user may be analyzed and stored to determine his or her historical usage (e.g., previous drops). In other embodiments, the data may be analyzed and stored for multiple users to determine the historical drops of multiple users.

Those of ordinary skill in the art may appreciate that by monitoring drag and drop operations and the drop destinations upon which entities are dropped, at least one drop destination for a selected entity may be emphasized based on the monitored drop destinations to assist users. Moreover, upon a user initiation of a drag and drop operation on a selected entity, embodiments consistent with the present invention may generate path vectors of varying strength for drop destinations based upon the frequency of previous drag and drop operations between a similar entity as the selected entity and each drop destination. Thus, the generation of path vectors may also be based upon the monitored drop destinations.

Figure 3:
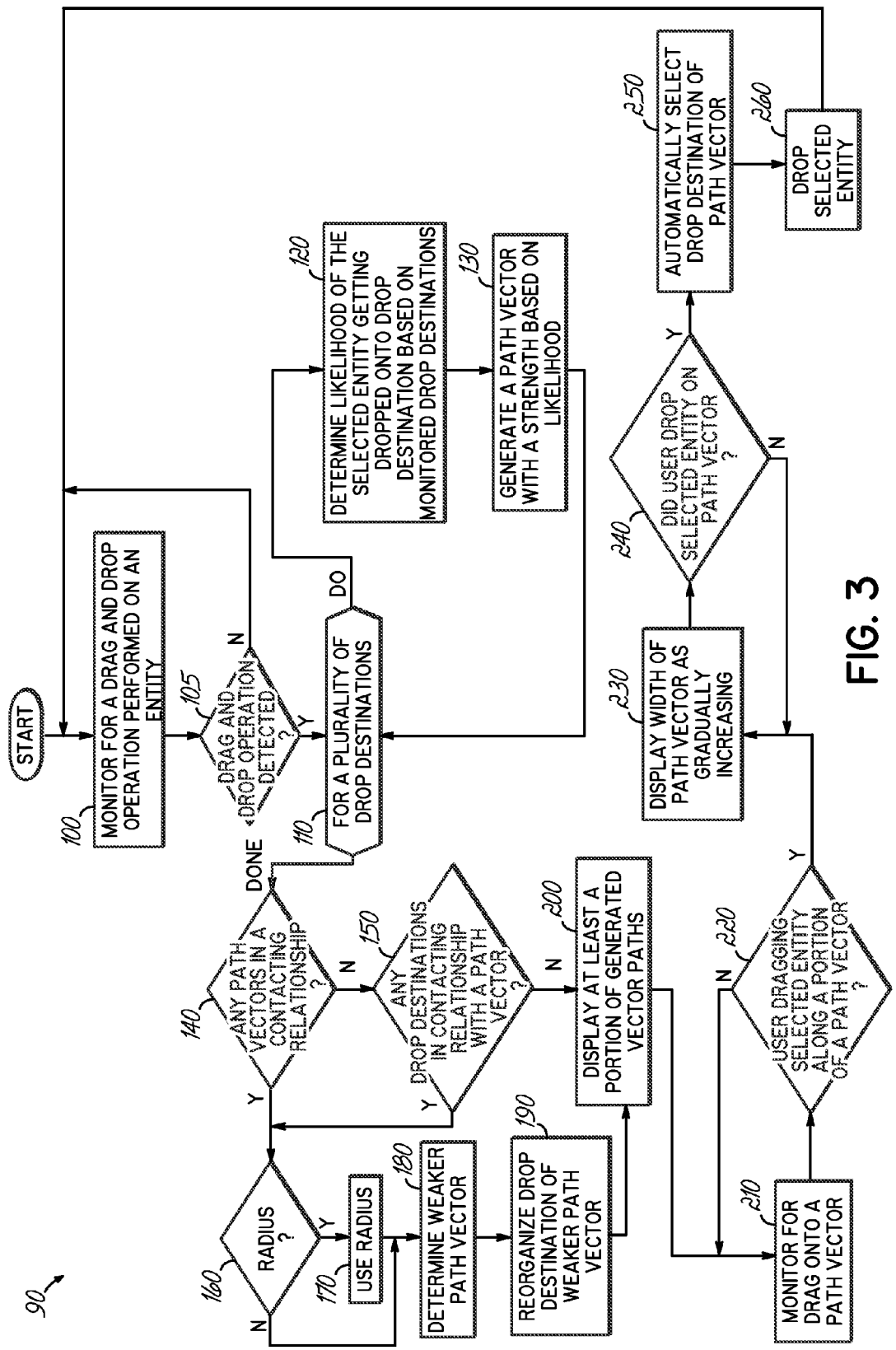
FIG. 3 is a flowchart of a path vector generating routine consistent with the invention.

Turning now to FIG. 3, FIG. 3 illustrates an exemplary path vector generating routine 90 consistent with the principles of the present invention. Starting with block 100, block 100 monitors for a drag and drop operation on a entity. The entity may be selected by a user, for instance, by the user clicking on the entity. Next, block 105 determines whether a drag operation has been detected. If not, control passes to block 100 to continue to monitor for a drag and drop operation. However, if a drag and drop operation was detected, then control passes to block 110 which may start a FOR loop.

Specifically, block 110 starts a FOR loop to process a plurality of potential drop destinations. For instance, a plurality of the potential drop destinations on a display may be processed. The plurality of drop destinations may be all or less then all of the drop destinations upon which the selected entity may be dropped. As an example, if a selected entity may be dropped onto ten different drop destinations, the FOR loop may encompass all ten drop destinations or five, or six, etc.

The FOR loop generally encompasses blocks 110, 120, and 130. Starting with block 110, block 110 starts the FOR loop. Next, for each drop destination of the plurality of drop destinations, block 120 determines the likelihood that the selected entity will be dropped onto the drop destination based upon the prior monitored drop destinations from routine 60 in FIG. 2. Next, block 130 calculates a path vector from the drop destination to the selected entity or vice versa, and the strength of the path vector may be based upon the likelihood that the selected entity will be dropped onto this drop destination as determined in block 120.

As an example, a graphical display element corresponding to a PDF document may be historically dropped onto a graphical display element corresponding to a folder of pictures, etc. As such, the path vector between a selected entity such as a graphical display element corresponding to a PDF document and a drop destination such as a graphical display element corresponding to a folder of pictures may be stronger than the path vector between the graphical display element corresponding to the PDF document entity and a graphical display element corresponding to the trash. However, it may be just as likely that the path vector between the graphical display element corresponding to the PDF document and a graphical display element corresponding to the folder of pictures is weaker than another drop destination such as a graphical display element corresponding a PDF reader application.

Returning to block 130, the path vectors may be calculated via coordinates (e.g., utilizing x and y coordinates). Furthermore, the length of a path vector may vary, in other words, x coordinates may be increased or decreased. For example, in some embodiments, the display representation of a path vector may appear to touch the display representation of a selected entity and a display representation of a drop destination when it is displayed on a display. However, such need not be the case. Similarly, path vectors may be generated of different lengths and display representations for these path vectors may also be displayed on a display.

The historical drops, the type of historical drop destinations and entities, as well as practically any other data associated with dragging and dropping an entity may be monitored and analyzed to generate path vectors of varying strength. However, in some embodiments, a strength need not be determined for a path vector consistent with the invention. Additionally, path vectors need not be generated at all consistent with the invention. Furthermore, instead of associating the strength with a path vector associated with a drop destination and emphasizing a drop destination via a path vector, the strength determined from the monitored drop destinations may be emphasized directly by the drop destination. For instance, the strongest drop destination may be enlarged relative to other destinations. Nonetheless, those of ordinary skill in the art will appreciate that other approaches may be utilized to emphasize at least one drop destination for a selected entity, for example, by highlighting a drop destination, highlighting at least a portion of a plurality of drop destinations (e.g., using colors, attributes, animation, sizing), etc.

Once the FOR loop has been processed for the plurality of drop destinations, control passes to block 140 to determine if any path vectors are in a contacting relationship. A contacting relationship is one where a display representation of a path vector may intersect or may be in contact with a display representation of another path vector or in contact with a display representation of a drop destination (discussed further in connection with block 150)). One of ordinary skill in the art may appreciate that it may be preferable to limit or avoid having path vectors or drop destinations with display representations that are in a contacting relationship to facilitate dragging and dropping for users, which may reduce the risk of accidental drops.

If any display representations of path vectors will be in a contacting relationship when displayed, then at least one drop destination associated with one of these path vectors may be reorganized. For instance, a drop destination may be reorganized to a position on the display where the display representation of the path vector of the drop destination is no longer in a contacting relationship, and the display representation of the drop destination may be displayed at the new reorganized position on the display in block 200 hereinbelow. The reorganization may be based upon the strength of the path vector associated with the drop destination (e.g., the drop destination with the strongest path vector is not reorganized, the drop destination with the strongest path vector is reorganized, the drop destination with a weaker path vector is reorganized, etc.). It is worth noting that reorganization can be accomplished, for example, by displaying the display representation of the path vector differently than that of the other contacting path vector (e.g., as an arc) or moving the drop destination such that the display representation of the drop destination is moved to a different position on the display.

Additionally, if display representations of path vectors are not in a contacting relationship, control passes to block 150 to determine if any display representations of drop destinations are in a contacting relationship with a path vector (or a drop destination). For instance, block 150 determines if there is any display representation of a drop destination that obstructs or would intersect with a display representation of a path vector. It may also be possible for a display representation of a drop destination to be in a contacting relationship with another display representation of a drop destination. If a drop destination is in any contacting relationship, the drop destination may be reorganized such that the display representation of the drop destination is displayed on a different position on the display by passing control to block 160. Those of ordinary skill in the art may appreciate that by reorganizing path vectors that are in a contacting relationship and/or drop destinations that are in a contacting relationship, accidental drops may be reduced. Furthermore, although a path vector does not need to be generated for each drop destination, those of ordinary skill in the art may appreciate that it is preferable that for the drop destinations where a path vector is generated, that the drop destinations do not share a single path vector to also avoid accidental drops.

Additionally, a drop destination may be reorganized on a display in a disciplined manner. For instance, a radius may be used, which may be configurable by a user, such that the drop destination is reorganized within that radius. By doing so, a user may not have to spend time trying to locate display representations of drop destinations on his or her display as the drop destinations may be reorganized within the general area and therefore the display representations will be displayed within the general area.

Additionally, in some embodiments, the drop destinations associated with weaker path vectors, which may indicate that based upon the monitored drop destinations these destinations are not as likely to be the ones on which a user drops a selected entity, may be reorganized and not drop destinations associated with stronger path vectors, which may indicate that these are drop destinations onto which the user may wish to drop the selected entity. In some embodiments, the system may make a greater attempt to clear any obstructions or contacting relationships the stronger the path vector is for a drop destination. Furthermore, the stronger a path vector of a drop destination, the easier it may be to drop onto the drop destination associated with that strong path vector with little mouse movement. However, in some embodiments drop destinations with weaker path vectors and/or drop destinations with stronger path vectors may be reorganized. In such a scenario, the drop destination to be reorganized may depend upon not which has a weaker or stronger path vector but upon which may be easiest to reorganize without dramatically changing the organization of the drop destinations as compared to the organization before the drag and drop operation was initiated by a user. As an example, a drop destination (with a path vector either weaker or stronger) may be reorganized to a different location to avoid having to reorganize four other drop destinations, and the display representation of the drop destination may be displayed at the new reorganized position on the display. Other techniques may be readily apparent to those of ordinary skill in the art as well.

Returning to block 160, block 160 determines whether or not there is a radius. If so, control passes to block 170 to utilize the radius for reorganizing a drop destination and then control passes to block 180 to determine the weaker path vector. However, if a radius is not available, control also passes to block 180 to determine a weaker path vector. Next, block 190 reorganizes the drop destination associated with the weaker path vector determined in block 180. Those of ordinary skill in the art may appreciate as described hereinabove that the drop destination of a weaker path vector may be reorganized and a drop destination with a stronger path vector may be left in place. However, in some embodiments either the drop destination with the weaker path vector or the drop destination with a stronger path vector may be reorganized. Moreover, in some embodiments, instead of reorganizing the drop destination, a path vector may be reorganized into a non-contacting relationship with another path vector or with a drop destination as generally described above.

Next, control passes to block 200 to display display representations for at least a portion of the generated path vectors. Control also passes to block 200 from 150 if no path vectors or drop destinations were in a contacting relationship. The display representations for path vectors may be displayed with a distinct color, shading, etc. help guide the user. In particular, the display representations of two path vectors may be displayed differently from one another based upon the respective strengths of such path vectors (e.g., the width of the display representation of the stronger path vector may be displayed wider than the width of the display representation of a weaker path vector, display representation of the stronger path vector may be displayed with highlighting whereas the display representation of a weaker path vector may not be highlighted). As such, the width or amplitude of the display representation of the path vector may also be dependent upon the strength of the path vector. For instance, the more likely a drop destination is predicted for the selected entity (i.e., strong path vector), the greater the magnitude or width of the path vector associated with that drop destination. Displaying at least a portion of the generated path vectors may include displaying all of the path vectors generated or less than all of the path vectors. For instance, the path vector that is the weakest may not be displayed to limit clutter consistent with the invention. However, display representations for some or all of the path vectors may be displayed similarly. For instance, display representations for one or more of the strongest path vectors may be displayed in green or different shades of green and display representations for one or more of the weaker path vectors may be displayed in red or different shades of red.

Next, control passes to block 210 to monitor for a drag of the selected entity onto a display representation of a path vector on the display. Block 220 determines whether a user is dragging the selected entity along a portion of a display representation of a path vector. If not, control returns to block 210 to continue to monitor for a drag operation on a display representation of a path vector. However, if a user is dragging the selected entity on a display representation of a path vector, then control passes to block 230 to display the width of the display representation of the path vector as gradually increasing.

In some embodiments, the width of the display representation of a path vector may be initially displayed as narrow, thus, requiring a higher level of accuracy to get onto the path, but it may be displayed as gradually increasing in width as a user drags along the display representation of the path vector and the selected entity approaches the display representation of the drop destination associated with that path vector. In other words, as a user begins dragging along display representation of that path vector, the closer the selected entity is dragged to display representation of the drop destination, the less accuracy may be needed to drop onto the drop destination associated with that path vector. Instead, the dragging movement of the user may stray from the center of the display representation of the path vector and yet, the drop destination may remain selected. As such, the tolerance range of the path vector may be higher and a user may have to dramatically stray from the display representation of the path vector to switch to a different path vector; thus, reducing accidental drops. Furthermore, the level of accuracy needed to drop onto the path vector upon which the user may be dragging along is less than may have been required by conventional techniques. Additionally, in some embodiments, the display representation of a path vector may be highlighted whenever the selected entity is on it.

Next, block 240 determines whether the user has dropped the selected entity on the display representation of the path vector. If not, control returns to block 230 to display the width of the display representation of the path vector as gradually increasing. Once the user drops the selected entity on the display representation of the path vector, control passes to block 250 to automatically select the drop destination associated with the path vector. As such, the selected entity may be dropped onto the drop destination without further movement by the user.

Next, the selected entity is dropped in the drop destination associated with that path vector in block 260 and control passes to block 100 to continue to monitor for drag and drop operations on a selected entity by a user. It is worth noting that in some embodiments the user may release the selected entity along any portion of the display representation of the path of the vector and the selected entity may be dropped onto the drop destination associated with that path vector. As such, a drop destination is selected in an automated manner utilizing at least a portion of the display representation of the path vector, but a user does not have to drag the selected entity along the entire length of the display representation of the path vector.

Figure 4:
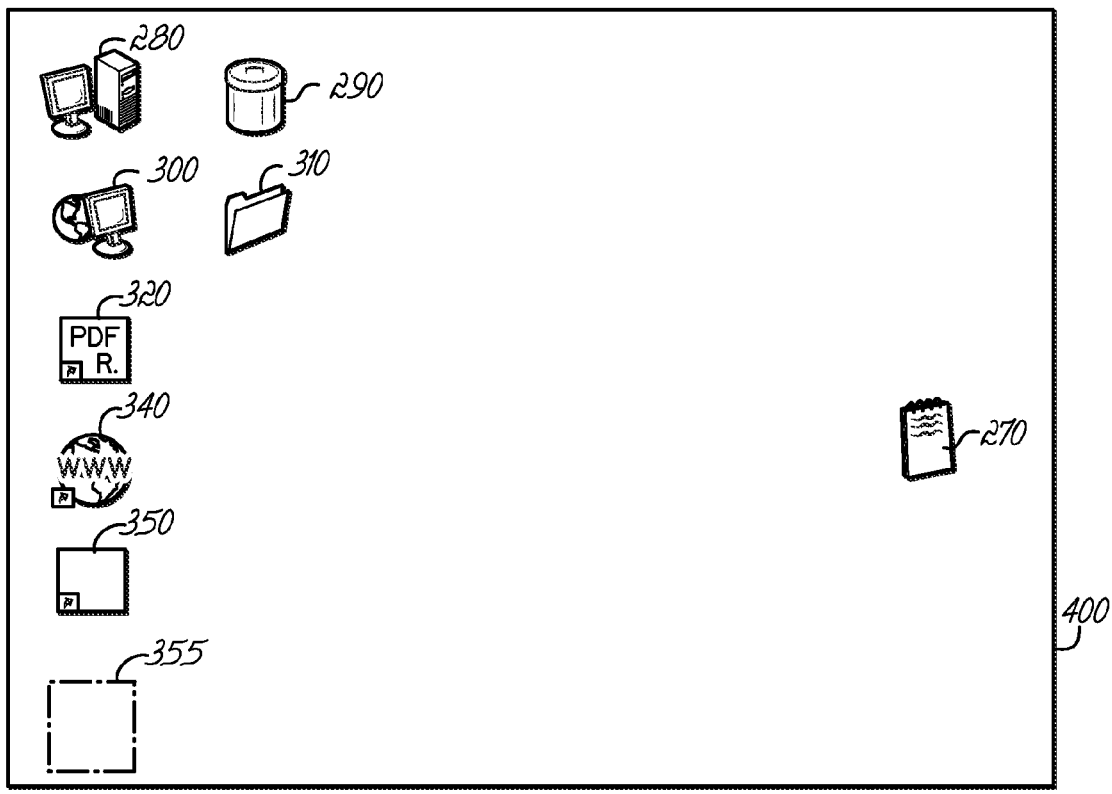
FIG. 4 is a diagram of a display prior to execution of the routine of FIG. 3.

Turning now to FIG. 4, which illustrates an example of a display 400 with various display representations of drop destinations prior to execution of routine 90. In particular, FIG. 4 illustrates an entity 270 that may be a document. Additionally, display 400 may have drop destinations such as those depicted in FIG. 4. Starting from the left, display 400 may have the following drop destinations: a files on computer icon 280, a trash icon 290, a computers in network icon 300, a folder icon 310, a PDF reader icon 320, a web or Internet browser icon 340, an application icon 350, and a location 355.

Figure 5:
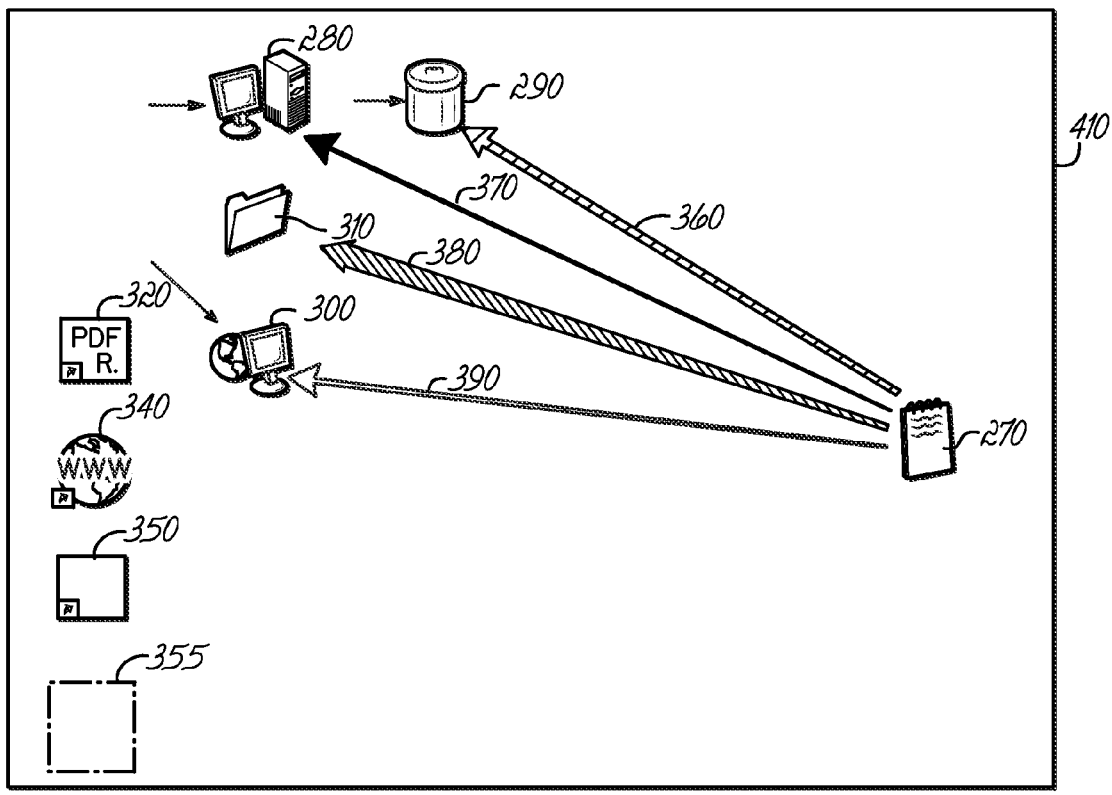
FIG. 5 is a diagram of the display of FIG. 4 that may result from the execution of the routine of FIG. 3.

Next, FIG. 5 illustrates how display 400 may be displayed to a user after the user initiates dragging of the display representation of document 270. Specifically, upon user initiation of a drag operation, path vectors may be calculated for drop destinations 280 through 355. In some embodiments, path vectors may be generated for each of these drop destinations or for less than all drop destinations, similarly, drop destinations for all or less than all of the generated path vectors may be displayed. Four path vectors are displayed on display 410. This example assumes that all of the icons 280-355 are drop destinations based upon previously monitored drag and drop operations, which may include the historical drops of entities similar to document 270. As such, at least one of all of these drop destinations may be emphasized. However, in another example, the monitored drag and drop operations may indicate that only icons 280, 290, 300, and 310 are drop destinations and at least one of these four drop destinations may be emphasized.

Returning to the original example, a display representation for path vector 360 is displayed between document 270 and trash 290, a display representation for path vector 370 is displayed between document 270 and files on computer 280, a display representation for path vector 380 is displayed between document 270 and folder 310, and a display representation for path vector 390 is displayed between document 270 and networks in computer 300. It is worth noting that each display representation of the path vectors is depicted differently (e.g., shading, solid, etc.) and that the display representations path vectors 380 and 360 are displayed as wider than that of the weaker path vectors, path vectors 370 and 390. The display representation of the strongest path vector, path vector 380, is displayed with the largest width.

Those of ordinary skill in the art may also appreciate that drop destinations 280, 290 and 300 were reorganized. In particular, drop destination 310, associated with the strongest path vector 380, was not reorganized and its display representation is displayed in the same static location (or generally remains in the same static location as the drawings may not be drawn to scale and/or accuracy) as depicted in display 400 in FIG. 4 prior to the user initiation of the drag operation, whereas drop destinations 280, 290 and 300, associated with weaker path vectors, were reorganized and there display representations were displayed in the new positions. A radius, which may be configurable by a user, may be used to limit the reorganization on the display. It is also worth noting that drop destination 280 was generally reorganized to limit or avoid a contacting relationship(s) with folder icon 310, trash icon 290 or path vectors thereof. For instance, the display representation of path vector 370 may have otherwise been in a contacting relationship with the display representation of path vector 360 of drop destination 290 or with the display representation of drop destination 310 had drop destination 280 not been reorganized and remained in the same position as depicted in display 400. Similarly, networks in computer icon 300 was generally reorganized to avoid contacting relationships.

Figure 6:
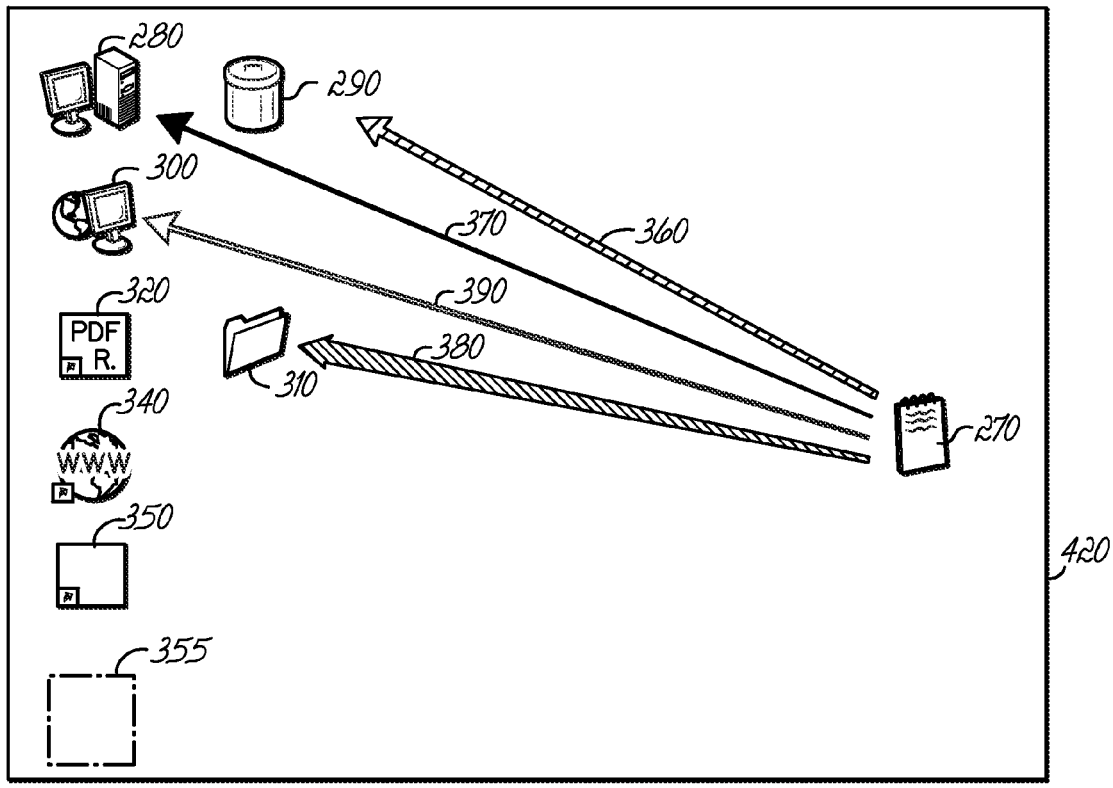
FIG. 6 is an alternative diagram of the display of FIG. 4 that may result from the execution of the routine of FIG. 3.

FIG. 6 illustrates another example of a display that may be presented after execution of routine 90 consistent with the principles of the present invention. One of the differences between display 420 of FIG. 6 and display 410 of FIG. 5 is the reorganization of the drop destinations. In particular, folder icon 310, the drop destination with the strongest path vector 380, is reorganized in display 420, and the display representations of drop destinations 280, 290 and 300, associated with weaker path vectors, were left in the same static location as in display 400 of FIG. 4. Those of ordinary skill in the art may appreciate that by reorganizing folder 310, three other drop destinations may not need to be reorganized to avoid contacting relationships. As such, the user may prefer the reorganization of fewer drop destinations even if it may lead to the reorganization of display representation of the drop destination with the strongest path vector on the display. In some embodiments, the user may be able to configure their system with their reorganization scheme preferences.

Figure 7:
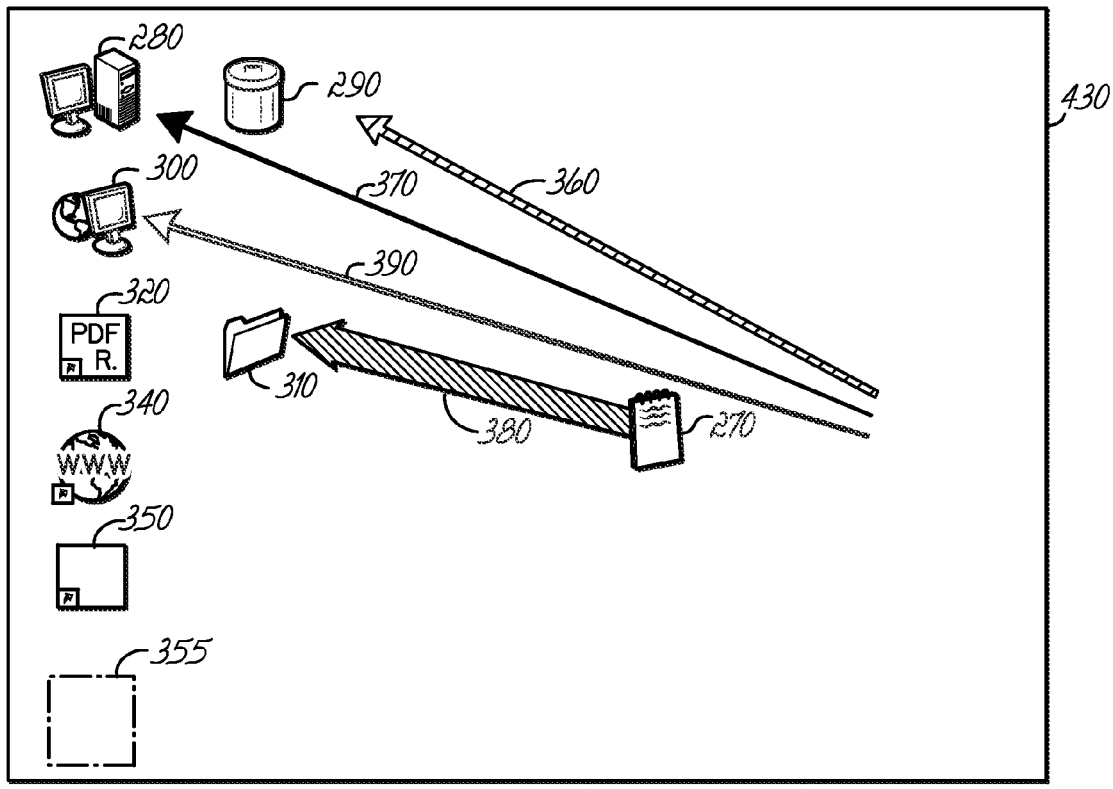
FIGS. 7 and 8 are diagrams of the display of FIG. 6, illustrating an increase in width of a path vector as a user moves a selected entity along the path vector.

FIG. 7 illustrates the display representation of path vector 380 as gradually increasing in width in response to a user dragging document 270, the selected entity, along a portion of the display representation of the path vector. In particular, by gradually increasing the width of the path vector, a user may be more aware that the selected entity will be dropped onto drop destination 310, and not accidentally onto another drop destination. Moreover, a wider path vector 380 may have a higher tolerance to the user's dragging, in other words, the user may drag along any portion of the larger surface area of the display representation of the path vector and may still select drop destination 310 as the drop destination upon which document 270 will be dropped. Nonetheless, the user may stop dragging along the display representation of path vector 380 and may start to drag along any of the other display representations of path vectors 360, 370 and 390. If the user starts dragging along one of these other path vectors, then the width of the display representation of that path vector may be depicted like path vector 380 as increasing in width, and in some embodiments, the width of path vector 380 may return to its previous size as illustrated in display 420 of FIG. 6.

Returning to path vector 380, drop destination 310 may be automatically selected if the user drops document 270 along any portion of the display representation of path vector 380, and document 270 may be dropped into folder 310. As generally described hereinabove, the wider the path vector, the higher the tolerance may be for drag movements and the less accuracy needed to select the drop destination of that path vector, however, the narrower the display representation of a path vector, the lower the tolerance, and more accuracy may be needed to drag onto a path vector with a narrow width. However, if a user drops a selected entity onto a narrow display representation of a path vector, the drop destination of that path vector may be similarly selected and the selected entity may be dropped onto it.

Figure 8:
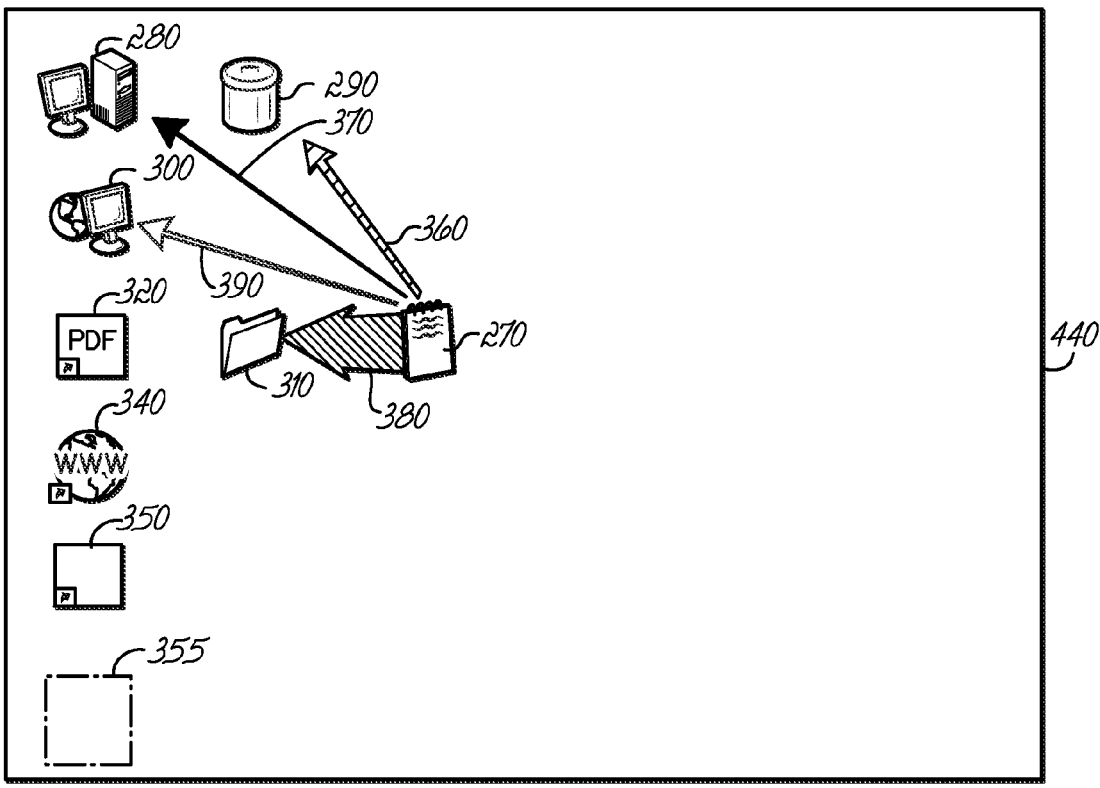

FIG. 8 illustrates a display 440 that may be displayed as the user continues to drag document 270 along the display representation of path vector 380 of folder 310. In particular, the width of the display representation of the path vector 380 may continue to gradually increase as the user continues to drag. Those of ordinary skill in the art may also notice that the display representations of path vectors 360, 370 and 390 originate from different points than those in display 430 of FIG. 7. In particular, one display illustrates them as originating from the initial location of document 270 (display 430) and the other display illustrates them originating from the current location of document 270 (display 440). Some embodiments consistent with the invention may differ as to the origination point, nonetheless, these and other variations are consistent with the principles of the present invention.

Figure 9:
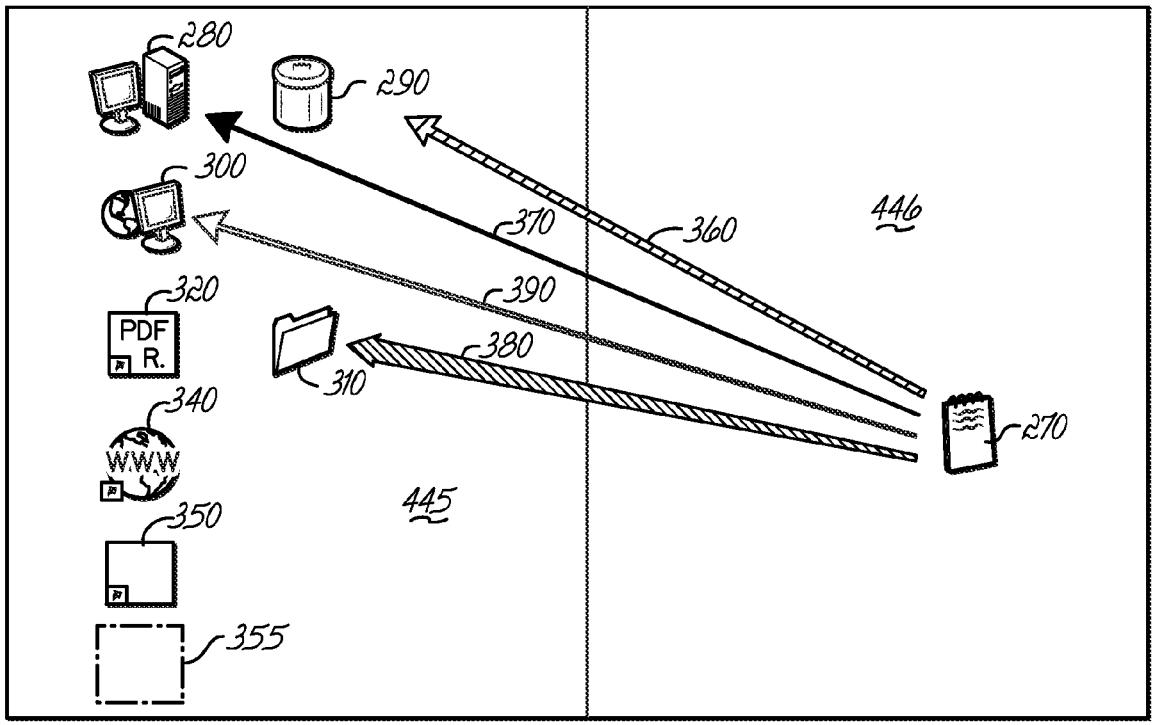
FIG. 9 is an alternative diagram of the display of FIG. 4 that may result from the execution of the routine of FIG. 3.

Turning to FIG. 9, display 450 in FIG. 9 is similar to display 420 in FIG. 6 and also illustrates how the path vectors may be displayed after processing routine 90 of FIG. 3. In particular, one of the differences between display 420 and display 450 is that display 450 has two areas, area 445 and area 446. In particular, display 450 may be illustrative of a multi-monitor or multi-display system where a selected entity may be dropped onto a different area. In particular, document 270, which is located in area 446, may be dropped onto area 445, and the display representations of path vectors may be at least partially displayed in area 446 and at least partially displayed in area 445. Nonetheless, the user may similarly start dragging along a portion of the display representation of a path vector in area 446, the width of the display representation of the path vector may gradually increase as the user drags along it, and the user may drop document 270 along any portion of the display representation of the path vector, which will automatically select the drop destination of that path vector and document 270 may be dropped into that drop destination in the other area.

Those of ordinary skill in the art may appreciate that users may be assisted in dropping an entity by the principles of the present invention. Moreover, it is worth noting that these may be implemented without dramatically changing the drag and drop paradigm with which users are accustomed. Additionally, those of ordinary in the art may appreciate that displays may vary in size. For instance, some may be small such as those on a PDA or large such as a wall screen. As such, the routines and accompanying material herein can be adapted for varies display sizes. In particular, for a wall screen display, the length of the path vectors may be longer than those on a corresponding display. Nonetheless, the same functionality described herein may be performed.

Various modifications may be made to the illustrated embodiments without departing from the spirit and scope of the invention. Therefore, the invention lies in the claims hereinafter appended.

What is claimed is:

1. A computer implemented method of interacting with a computer, the computer implemented method comprising:
    (a) monitoring drop destinations of a plurality of drag and drop operations performed on a plurality of entities;
    (b) in response to a user initiation of a drag and drop operation on a selected entity, emphasizing a plurality of drop destinations for the selected entity based upon the monitored drop destinations, wherein emphasizing includes generating a plurality of path vectors between the selected entity and the plurality of drop destinations based upon the monitored drop destinations; and
    (c) displaying display representations of the plurality of path vectors between the selected entity and the plurality of drop destinations on a display.

2. The computer implemented method of claim 1, wherein a drop destination of the plurality of drop destinations is at least one of an object, a graphical element, a folder, an icon, a shortcut, a location, or an area.

3. The computer implemented method of claim 1, further comprising calculating a strength for at least a portion of the plurality of path vectors between the selected entity and the plurality of drop destinations, wherein the strength for each path vector represents the likelihood that the selected entity will be dropped onto the drop destination associated with the path vector.

4. The computer implemented method of claim 3, further comprising displaying the display representations for two path vectors differently from one another based upon the respective strengths of such path vectors.

5. The computer implemented method of claim 3, further comprising displaying the display representation of a path vector of a drop destination of the plurality of drop destinations in a non-contacting relationship with at least one of a display representation of another path vector or a display representation of another drop destination.

6. The computer implemented method of claim 3, further comprising displaying the display representation of a path vector of a drop destination as gradually increasing in width in response to a user dragging the selected entity along at least a portion of the path vector.

7. The computer implemented method of claim 3, further comprising selecting in an automated manner a drop destination of the plurality of drop destinations utilizing at least a portion of the display representation for the path vector associated with the drop destination, wherein the selected entity is dropped onto the selected drop destination.

8. The computer implemented method of claim 7, wherein the drop destination is selected in response to the user dragging the selected entity along the portion of the display representation for the path vector associated with the drop destination.

9. The computer implemented method of claim 3, further comprising reorganizing a drop destination of the plurality of drop destinations to a different position on the display where it is in a non-contacting relationship with at least one of a display representation of another path vector or a display representation of another drop destination.

10. The computer implemented method of claim 9, wherein the reorganization is based upon the strength of the path vector associated with the drop destination.

11. The computer implemented method of claim 9, further comprising reorganizing a drop destination of the plurality of drop destinations on the display based upon a radius.

12. The computer implemented method of claim 3, further comprising reorganizing a drop destination with a weaker path vector rather than a drop destination with a stronger path vector to a different position on the display.

13. The computer implemented method of claim 1, wherein the monitoring of drop destinations of a plurality of drag and drop operations performed on a plurality of entities includes monitoring historical drop destinations.

* * * * *